United States Patent [19]
Ambs

[11] Patent Number: 6,028,817
[45] Date of Patent: Feb. 22, 2000

[54] MARINE SEISMIC SYSTEM WITH INDEPENDENTLY POWERED TOW VEHICLES

[75] Inventor: Loran D. Ambs, Fulshear, Tex.

[73] Assignee: Western Atlas International, Inc., Houston, Tex.

[21] Appl. No.: 09/000,769

[22] Filed: Dec. 30, 1997

[51] Int. Cl.[7] .................................................. G01V 1/38
[52] U.S. Cl. ............................................... 367/16; 367/18
[58] Field of Search ................................ 367/15, 16, 23, 367/17, 20, 24, 76; 324/345; 364/421

[56] References Cited

U.S. PATENT DOCUMENTS

| | | | |
|---|---|---|---|
| 3,256,501 | 6/1966 | Smith, Jr. | 367/76 |
| 3,281,767 | 10/1966 | Cryar | 367/16 |
| 3,506,955 | 4/1970 | Backus et al. | 340/7 |
| 3,613,627 | 10/1971 | Kennedy | 114/235 F |
| 3,744,021 | 7/1973 | Todd | 340/15.5 TC |
| 3,786,408 | 1/1974 | Jenskinson et al. | 340/15.5 MC |
| 3,806,863 | 4/1974 | Tilley et al. | 340/7 R |
| 3,806,864 | 4/1974 | Broding et al. | 340/15.5 TS |
| 3,875,497 | 4/1975 | Madsen | 324/3 |
| 3,921,124 | 11/1975 | Payton | 340/7 R |
| 3,934,220 | 1/1976 | Davis | 340/15.5 MC |
| 4,004,265 | 1/1977 | Woodruff et al. | 340/2 |
| 4,064,479 | 12/1977 | Ruehle | 367/15 |
| 4,087,780 | 5/1978 | Itria et al. | 340/7 R |
| 4,175,432 | 11/1979 | Gibson | 73/170 A |
| 4,394,573 | 7/1983 | Correa et al. | 250/253 |
| 4,434,364 | 2/1984 | Correa et al. | 250/253 |
| 4,729,333 | 3/1988 | Kirby et al. | 114/244 |
| 4,737,938 | 4/1988 | Grau | 367/21 |
| 4,781,140 | 11/1988 | Bell et al. | 114/244 |
| 4,835,744 | 5/1989 | Todd et al. | 367/20 |
| 4,918,668 | 4/1990 | Sallas | 367/22 |
| 4,942,557 | 7/1990 | Seriff | 367/15 |
| 5,144,588 | 9/1992 | Johnston et al. | 367/16 |
| 5,408,947 | 4/1995 | Curto et al. | 114/253 |
| 5,724,241 | 3/1998 | Wood et al. | 364/420 |

*Primary Examiner*—Christine K. Oda
*Assistant Examiner*—Victor J. Taylor
*Attorney, Agent, or Firm*—Madan, Mossman & Sriram, P.C.

[57] ABSTRACT

The present invention discloses a marine seismic system with a control system and at least one powered (manned or unmanned) tow vehicle with at least one seismic apparatus or system attached thereto, the at least one powered tow vehicle for selectively towing under its own power the at least one seismic apparatus or system. In one aspect such towing is done in controlled conjunction with movement of one or more host vessels. In another aspect such a marine seismic system includes at least one service boat for servicing the at least one powered tow vehicle.

43 Claims, 2 Drawing Sheets

MARINE SEISMIC SYSTEM WITH INDEPENDENTLY POWERED TOW VEHICLES

BACKGROUND OF THE INVENTION

1. Field Of The Invention

This method is directed to marine seismic systems and, in one aspect, such systems with a streamer, streamers, and/or one or more seismic sources towed by one or more powered vehicles. Such vehicles may be manned or unmanned and tethered, or not, to a host vessel.

2. Description of Related Art

The prior art discloses a wide variety of marine seismic systems with one or more streamers and/or one or more seismic sources, some of which include a main or host vessel and other unmanned vessels, vehicles, or apparatuses such as floats, paravanes, or buoyant members which are connected to the host vessel by lines, cables or tethers. Considerable power is required for a host vessel to tow such existing seismic streamer systems and cables interconnecting sensing devices with a tow vehicle. A typical host vessel is able to tow a plurality of tow vessels and can carry a plurality of undeployed seismic streamers and associated apparatus.

With known cable tow systems, the location and spacing of system components is limited by the type, size, and length of cables used and by the characteristics of tow vehicles and other devices of the systems. Changing the configuration of an array of prior art components, e.g. streamers, can be a complex, time-consuming operation.

There has long been a need for an efficient and effective marine seismic system with system components that are easily positionable. There has long been a need for an efficient and effective marine seismic system with reduced host vessel power requirements. There has long been a need for such systems having sufficient flexibility and adjustability to efficiently and effectively locate sensors, streamers, sources or other components in desirable locations; in one aspect with resepct to a land based control system and in another aspect with respect to a host vessel. There has long been a need for simplified marine seismic systems with which component retrieval, replacement, and re-deployment are facilitated.

SUMMARY OF THE PRESENT INVENTION

The present invention, in certain embodiments, discloses a marine seismic system with at least one powered tow vehicle, manned or unmanned, and, in certain aspects, one or more streamers and/or one or more seismic sources. In one aspect there is no host vessel and in another aspect there is at least one main host vessel. In one embodiment such a tow vehicle is not connected to the host vessel by tethers or cables; although it is within the scope of this invention to use such a vehicle that is connected to the host vessel, and, in one aspect, releasably connected. In one embodiment at least one seismic apparatus (source, sensor, streamer, etc.) is towed by the host vessel. In one embodiment a plurality of seismic apparatuses are towed by the tow vessel and/or by a host vessel, which apparatuses are, in one aspect, at different depths and/or with one or more apparatuses at the surface. In one aspect of a system according to the present invention, a plurality of unmanned tow vehicles are employed, each towing one or more seismic sources, sensors, and/or streamers, which, in one aspect, are at different depths and/or with one or more at the surface. In one aspect, the tow vessel is on a water surface. In another aspect, the tow vessel is semi-submerged or submerged. In one embodiment, one or more tow vehicles are used without a host vessel.

In certain methods employing systems according to the present invention, one or more powered tow vehicles (manned or unmanned) are positioned at desired locations with respect to a host vessel and maintain position with respect to the host vessel.

Tow vehicles used in systems and methods according to the present invention may have on-board apparatus, known in the art, in communication with corresponding apparatus, also known in the art, either on the host vessel, on another vessel, and/or at a remote location. Such apparatus may be used for: remote control of tow vehicle heading, course, speed, and/or location; communication with other tow vessels and/or refueling/resupply boats; communication with remote locations and/or satellites; and/or for radio, laser/optical, and/or wire data links with a host vessel, and/or a remote location. Generated seismic data, navigation data, system status data, and/or location data may be transmitted from a sensor and/or streamer to a tow vessel and/or to another vessel, to a host vessel, and/or to a remote (e.g. land-based) location. Alternatively, the data may be transmitted directly to another vessel, to a host vessel, and/or to a remote (e.g. land-based) location.

In certain embodiments of systems and methods according to the present invention, a powered tow vehicle is selectively moored to or tethered to a host vessel. In one aspect such a vehicle initially towed by a host vessel (with one or more seismic apparatuses connected to the vehicle) proceeds under its own power while still connected to the host vessel. Then, as desired, the vehicle is set free from the host vessel. Such a vehicle is then positioned as desired with respect to the host vessel (or vessels) and can, e.g. for component repair or replacement, be re-positioned and then moved for re-connection to the host vessel. During such movement the vehicle can be maneuvered to avoid other streamers and vehicles.

In another embodiment, in any known marine seismic system one or more seismic sources and/or seismic streamers is towed by a powered tow vessel as described herein instead of being attached to and towed by a host vessel.

It is, therefore, an object of at least certain preferred embodiments of the present invention to provide:

New, useful, unique, efficient, nonobvious devices for marine seismic systems and methods of their use which employ one or more powered tow vehicles, each towing one or more seismic apparatuses, and, in one aspect, one or more host vessels with or without at least one seismic apparatus connected thereto;

Such systems and methods in which the vehicle(s) is remotely controlled from a host vessel and/or remote location;

Such systems and methods in which seismic apparatus repair, replacement, and re-deployment are facilitated;

Such systems and methods in which the tow vehicle(s) is/are selectively connected to, freed from, and re-connected to a host vessel and/or with each other;

Such systems and methods also employing manned or unmanned service/supply vehicles for accessing a powered tow vehicle and/or for retrieving data from and/or exchanging data with the tow vehicles(s); and Such systems in which the tow vehicle(s), service supply vehicle(s), and/or host vessel(s) have apparatus for: acquiring data; receiving and storing data; processing data; and/or transmitting data to a vehicle, vessel, and/or to a remote location.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figures 1, 2:
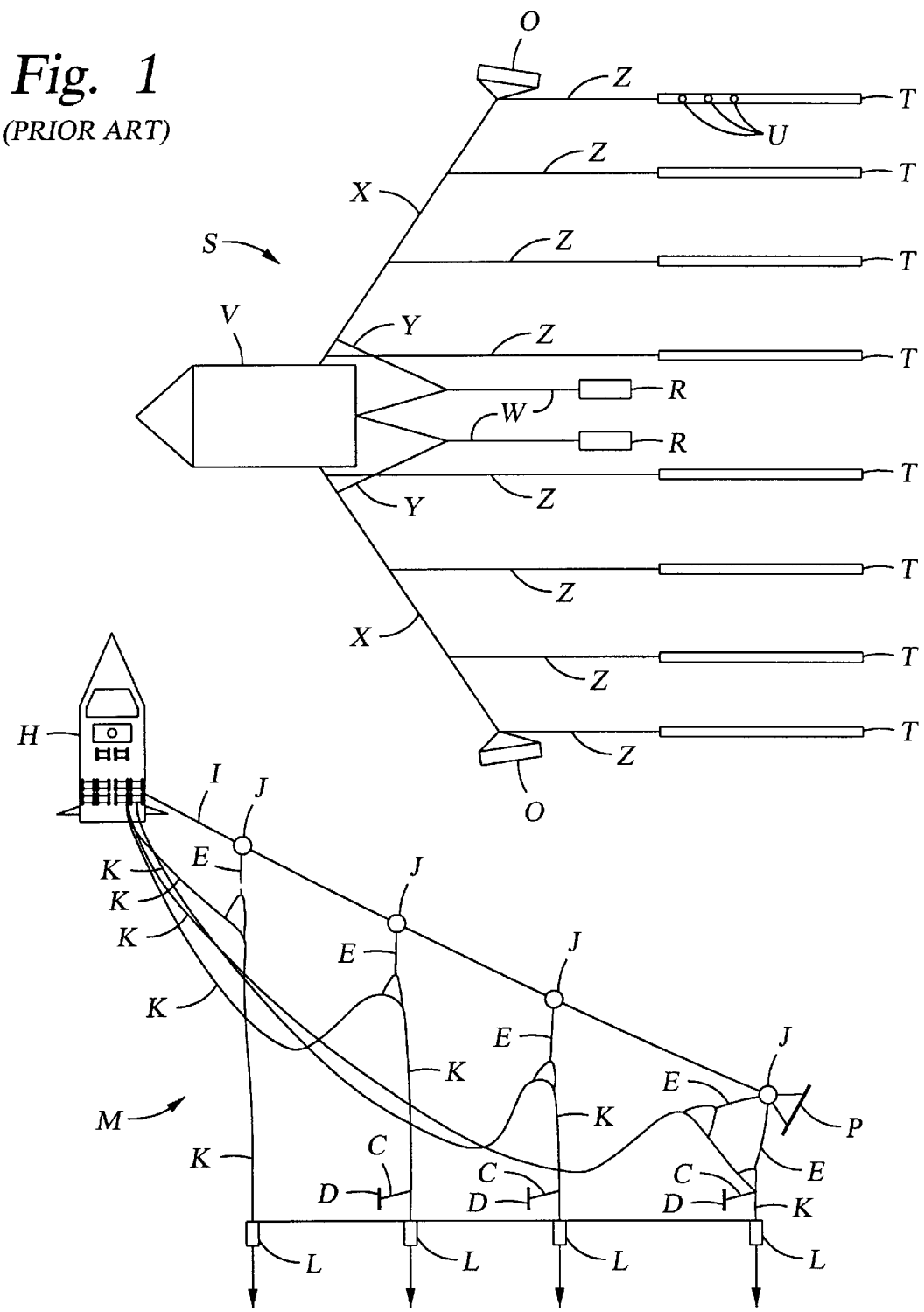
FIG. 1 is a schematic top view of a prior art marine seismic streamer system co-owned with the present invention.
FIG. 2 is a schematic top view of a prior art marine seismic streamer system co-owned with the present invention.

FIG. 1 shows a prior art marine seismic streamer system S with a host vessel V, a plurality of cables, tow cables X; tag lines Y; streamer lead-ins Z; a plurality of seismic sensors U on an array of seismic streamers T (each streamer T has one or more seismic sensors U), power sources and communication lines W; seismic sources (e.g. guns) R; and paravanes O. Each seismic sensor streamer is connected via cables to the host vessel V which tows all the cables, sensors, and other apparatuses. Such a system and its use are well known in the art.

FIG. 2 shows a prior art marine seismic streamer system M with a host vessel H from which extends a tow cable I to which are secured sliders or sheaves J. Streamer lead-ins K are connected to the sliders J and a seismic streamer L is connected at an end of each lead-in K. The lead-ins K are connected to tow cable I with bend restrictors and tag lines E. Of course lead-ins and other lines disclosed herein, in any embodiment of the systems of FIGS. 1–3, may be any desired length. Paravane P provides lateral forces to spread the assembly. Floats D are connected via cables C to the lead-ins K. Such a system and its use are well known in the art.

Figure 3:
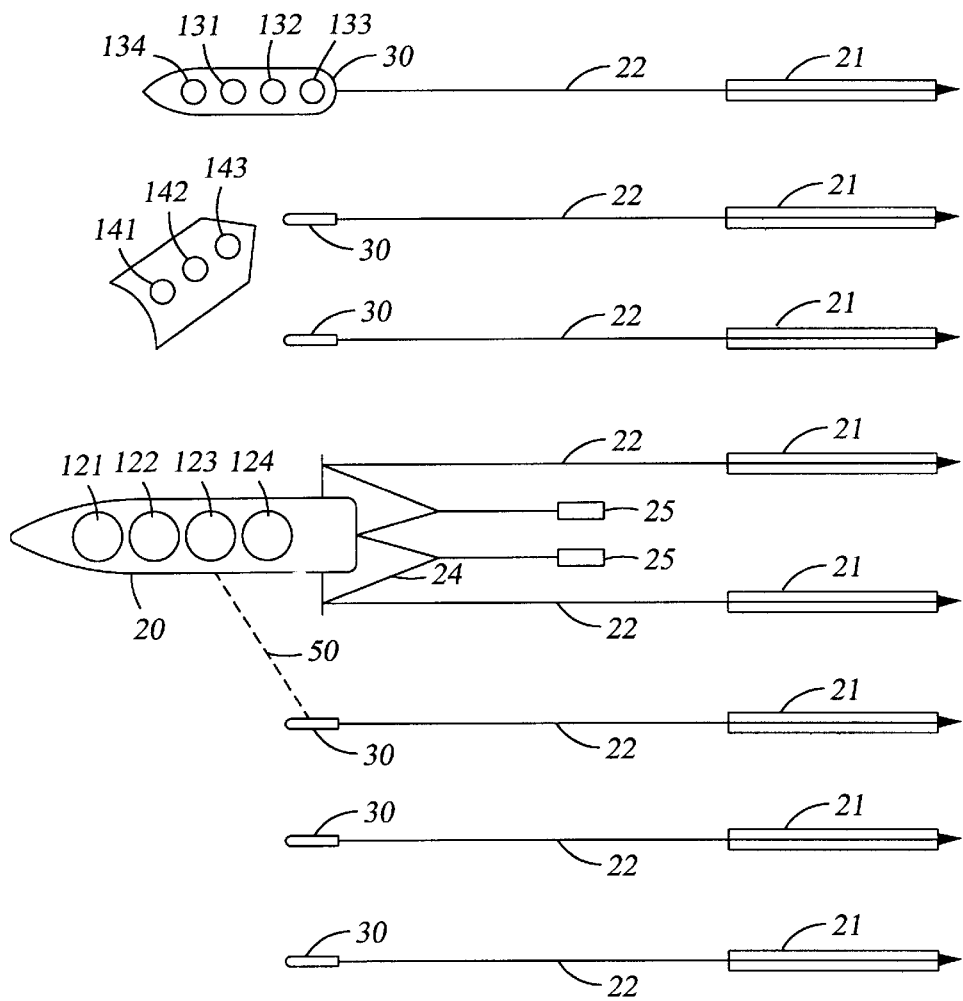
FIG. 3 is a schematic top view of a marine seismic streamer system according to the present invention.

FIG. 3 discloses a marine seismic system 10 according to the present invention which has a host vessel 20 to which are connected seismic sensor streamers 21, each including a plurality of seismic sensors. Tag lines 24 separate seismic sources 25 towed behind the host vessel 20.

A plurality of unmanned powered vessels 30 are positioned on either side of the host vessel 20. Each vessel 30 tows a seismic sensor streamer 21 via a streamer lead-in 22 connected between the vessel and the streamer. Alternatively one or more such vessels 30 may be positioned on only one side of the host vessel.

A service/supply boat 40 provides fuel to the various vessels 20 and 30; and, in one aspect, retrieves data from the vessels 30 and either takes the data to another vessel, another device, and/or to the host vessel 20 or sends it via a data link (e.g. radio or laser/optical system) to vessel 20, to a remote location or to another vessel. In one embodiment the boat 40 navigates and operates autonomously between the host vessel 20 and the vessels 30.

The dotted line 50 in FIG. 3 indicates that at any time any vessel (including the service supply boat 40 and any vessel 30) may be releasably tethered to the host vessel 20 at any point or location thereon.

It is within the scope of this invention to use one or more vessels 30; no vessel 40 or one or more vessels 40; and no host vessel or one or more host vessels 20. It is also within the scope of this invention to use one or more vessels 30 with at least one seismic source and/or at least one seismic streamer 21 with at least one or with a plurality of sensors with any known system (including but not limited to those as in FIGS. 1 and 2) which has none, one, or more than one seismic streamer connected to a host vessel. It is within the scope of this invention to use one or at least one vessel 30 and its related apparatus to tow one, two, three, four or more seismic sources and/or streamers. It is within the scope of this invention for vessel 30 to tow one or more seismic sources 25. These sources may be interspersed between streamers, outboard of streamers, or forward or aft of streamers.

The unmanned powered vessels 30 have apparatus thereon for communicating with the host vessel and/or with apparatus at remote locations. Also, these vessels, in one aspect, have remotely controlled and/or programmable guidance and control apparatus. Host vessel 20, tow vessel 30 and support vessel 40, in one aspect, each carry a known positioning system (e.g. but not limited to GPS, GLONASS) which provide precise locations of each vessel. Other measurement apparatuses which may provide locations are seismic sources, tail buoys and the like. Two way communication link (via hardwire link or radio, e.g. when untethered) between host vessel 20, tow vessel 30 and boat 40 provides a means for exchanging location and navigation data between vessels. Additional navigation data from the bridge of host vessel 20, may include the locations of other vessels, navigation hazards, etc. Examples of navigation data exchanged between vessels are (but are not limited to) vessel identification, heading, course-made-good, and speed. Examples of other information communication from tow vessels 30 and boat 40 to host vessel 20 are (but are not limited to) engine temperature, air temperature in instrumentation compartments, fuel level, shaft RPM, electric generator output, tow line tension, rudder angle, and tow depth of one or more depth sensors from a seismic streamer. Tow vessels 30 and boat 40 carry, in one aspect, known on-board computer based navigation systems which use location and navigation data provided by host vessel 20 to set an appropriate course and speed to accomplish a pre-programmed maneuver such as maintain position with respect to host vessel 20 or move from one position relative to host vessel to another. Each tow vessel 30 and boat 40 may be controlled by a human operator aboard host vessel 20. Instead of control from a host vessel, control may be accomplished from a land-based location (e.g. either adjacent to or remote from the location of the tow vessel(s) etc.) and/or from an aircraft either above or remote from the location of the marine seismic system. Commands may be communicated by any known communication system, including, but not limited to, hardwire link, underwater acoustic link, and/or radio. Such commands are, e.g. (but not limited to) controls for the engagement of auto-pilot, adjustment and maintenance of rudder angle, and control of shaft RPM.

In one aspect the vessel or vessels 30 have known apparatus for acquiring seismic data from the seismic sensors, for recording it, and for downloading such data to a service/supply boat or transmitting it to the host vessel or to a remote location. These known systems provide power to the seismic streamer and associated components such as acoustic sensors, depth control machinery, acoustic and radio navigation equipment, amplifiers and the like. The data acquisition system communicates with host vessel 20 regarding data acquisition parameters such as sample interval, record length, sensors to monitor distance, filter and amplifier settings, file and prospect identification and the like. Upon hardwire or radio command, a recording system records acoustic data from one or more sensors in one or more seismic streamers 21 along with support data indicating the status of system components at the time data was recorded. Data is stored in computer memory or written to a magnetic or optical media. Portions or all of the data collected may be transmitted to the host vessel 20 or to a remote location via apparatus in a tether, hardwire link and/or radio in real-time or some time after recording. Data transfer may be synchronous or asynchronous with data acquisition and may occur when onboard systems are not recording data. Alternatively, boat 40 may establish a hardwire link to a tow vessel to extract data from the tow vessel and communicate it to the host vessel 20 or to a remote location via hardwire link or radio.

In one method utilizing the system 10, the vessels 30 are initially tethered to the host vessel 20. Seismic streamers are deployed from the host vessel 20 and connected with the vessels 30 while the host vessel is towing the vessels 30. Then, by remote control, personnel on the host vessel 20 (or at a remote location) start engines on the vessels 30 so that the vessels 30 apply tow force to the seismic streamers. When the vessels 30 carry the tow load of the streamers, tethers connecting the vessels 30 to the host vessel 20 are released and personnel on the host vessel (or elsewhere) monitor the position of the vessels 30 and control them so desired positioning is maintained. If desired, any or all of the vessels 30 are repositioned one or more times with respect to the host vessel 20. If a seismic streamer malfunctions or is to be replaced, its vessel 30 moves away from the array to a repair location or vessel; or it backs off and then enters the array of vessels 30 in such a way that it approaches and moors to the vessel 20. If desired, the remaining vessels 30 are repositioned to account for the deletion of the malfunctioning seismic streamer.

A vessel 30 and its associated apparatus do not necessarily require the use of streamer lead ins, paravanes, and paravane cables.

As shown in FIG. 3, the host vessel (or vessels) 20 include: apparatus 121 for receiving data, e.g. from a seismic streamer 21, from a service boat 40, and/or from a tow vessel 30—either by wire (not shown) or wirelessly; apparatus 122 for storing received data including, but not limited to, seismic data; apparatus 123 for sending data including, but not limited to, seismic data by wire (not shown) or wirelessly to another vessel and/or to a remote location; and/or apparatus 124; e.g. an appropriately programmed computer for processing the data including, but not limited to, seismic data.

As shown in FIG. 3, the service boat (or boats) 40 include: apparatus 141 for receiving data, e.g. from a tow vehicle 30 by wire or fiber optic apparatus (not shown) or wirelessly; apparatus 142 for storing received data; and apparatus 143 for sending data by wire (not shown) or wirelessly to another vessel, to a host vessel, and/or to a remote location.

As shown in FIG. 3, a powered tow vessel (or vessels) 30 include: apparatus 131 for receiving data, including, but not limited to seismic data, from a seismic streamer 21; apparatus 132 for storing received data; and apparatus 133 for sending data by wire (not shown) or wirelessly to another vessel, to a service boat 40, to a host vessel 20, and/or to a remote location. In one aspect a tow vehicle 30 may have apparatus for processing data and for transmitting the processed data. By "tow vessel" herein is meant any vessel, boat, device, float or apparatus that can tow the item(s) connected thereto, said "tow vessel" having suitable power apparatus for such towing. "Processing" data as referred to herein with resepct to the processing of data on vessels, boats, or at a remote location includes, but is not limited to, the processing of generated seismic data by any known procesisng methods or programs and includes the use of appropriate computers at such location.

Figure 4A:
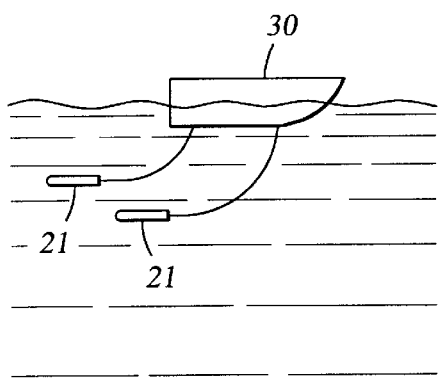
FIG. 4A is a side schematic view of a tow vessel of FIG. 3.
Figure 4B:
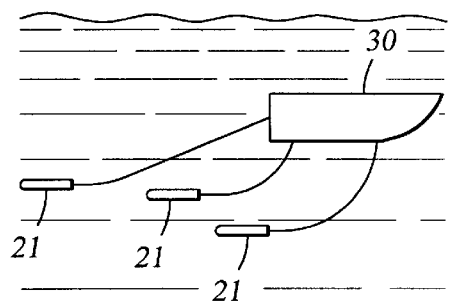
FIG. 4B is a side schematic view of a tow vessel of FIG. 3.

A tow vessel in any system according to the present invention, may tow multiple seismic apparatuses (e.g., but not limited to sensor streamers 21) with aparatuses at different depths (see FIG. 4A) and the tow vessel itself may be semi-submerged or submerged (see FIG. 4B).

It is seen, then, that the present invention, in various embodiments, provides a marine seismic system with at least one control system and at least one powered tow vehicle with at least one seismic apparatus attached thereto, the at least one powered tow vehicle freely and selectively movable for selectively towing under its own power the at least one seismic apparatus; such a system wherein the at least one powered tow vehicle is manned or is unmanned and has control apparatus 134 thereon for remote control thereof, the control apparatus receiving control signals from the control system; any such system wherein the at least one powered tow vehicle is a plurality of spaced-apart tow vehicles; any such system wherein the at least one control system is on at least one host vessel, and the at least one powered tow vehicle is for selectively towing the at least one seismic apparatus in conjunction with movement of the at least one host vessel; any such system wherein the at least one powered tow vehicle is selectively releasably connected to the at least one host vessel, and the system includes selective connection apparatus for releasably and selectively connecting the at least one powered tow vehicle to the at least one host vessel and/or to another tow vessel or boat; any such system including at least one service boat for servicing the at least one powered tow vehicle; any such system wherein the at least one seismic apparatus is at least one seismic sensor streamer including apparatus for receiving data and sending it to the at least one powered tow vehicle, and apparatus on the at least one powered tow vehicle for receiving, storing, and sending the data; any such system with at least one service boat for receiving data from the at least one powered tow vehicle, and apparatus on the at least one service boat for receiving the data from the at least one powered tow vehicle; any such system wherein the data is acquired by wire or wirelessly by the at least one service boat from the at least one powered tow vehicle and the system includingapparatus on the at least one service boat for by wire or wirelessly acquiring the data from the at least one powered tow vehicle; any such system with sending apparatus on the at least one powered tow vehicle for sending the data to another vessel having apparatus for receiving the data from the sending apparatus; any such system with sending apparatus on the at least one powered tow vehicle for sending the data to a location remote from the at least one powered tow vehicle; any such system wherein the at least one control system is on and/or includes at least one host vessel including apparatus for receiving data, for transmitting data; and/or for processing data; any such system wherein the at least one control system is located either on land or on another vessel spaced-apart from the at least one powered tow vehicle; any such system with at least one host vessel, and at least one host seismic system (source, sensor, streamer) connected thereto; any such system wherein the at least one seismic apparatus is at least one seismic source and/or at least one seismic sensor streamer; any such system wherein the at least one seismic sensor streamer is a plurality of seismic sensor streamers including at least a first seismic sensor streamer and a a second seismic sensor streamer, the second seismic sensor streamer at the same or at a depth different than that at which the first seismic sensor streamer is located; and any such system wherein the data includes generated seismic data, navigational data, system status data, and/or location (of vessel, vehicle, source, sensor, and/or streamer) data. The present invention also provides seismic data methods employing the systems and apparatuses descirbed above and as claimed below.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A marine seismic system comprising:
  a control system; at least one host vessel; and
  at least one powered tow vehicle with at least one seismic apparatus attached thereto, the at least one powered tow vehicle spaced apart from the at least one host vessel and the control system and controlled by the control system, the at least one powered tow vehicle freely and selectively movable for towing under its own power the at least one seismic apparatus.

2. The marine seismic system of claim 1 wherein the at least one powered tow vehicle is unmanned and further comprises control apparatus thereon for receiving control signals from the control system for remote control of the tow vehicle.

3. The marine seismic system of claim 1 wherein the at least one powered tow vehicle comprises a plurality of spaced apart two vehicles.

4. The marine seismic system of claim 1 wherein the at least one control system is on the at least one host vessel and the at least one powered tow vehicle selectively tows the at least one seismic apparatus in conjunction with movement of the at least one host vessel.

5. The marine seismic system of claim 3 wherein the at least one powered tow vehicle is selectively releasably connected the at least one host vessel, the marine seismic system further comprising:
  selective connection apparatus for releasably and selectively connecting the at least one powered tow vehicle to the at least one host vessel.

6. The marine seismic system of claim 1 further comprising at least one service boat for servicing the at least one powered tow vehicle.

7. The marine seismic system of claim 1 wherein the at least one seismic apparatus further comprises at least one seismic sensor streamer including apparatus for receiving data and sending the data to the at least one powered tow vehicle, and the at least one powered tow vehicle further comprises apparatus for receiving, storing, and sending the data.

8. The marine seismic system of claim 7 further comprising:
  at least one service boat having apparatus thereon for receiving data from the at least one powered tow vehicle.

9. The marine seismic system of claim 8 wherein the data is acquired wirelessly by the at least one service boat from the at least one powered tow vehicle.

10. The marine seismic system of claim 1 wherein the at least one powered tow vehicle further comprises sending apparatus for sending the data to a remote location having a receiving apparatus for receiving the data from the sending apparatus.

11. The marine seismic system of claim 10 wherein the remote location is on another vessel.

12. The marine seismic system of claim 1, wherein the control system is located on the at least one host vessel, the at least one host vessel further comprising apparatus for receiving data.

13. The marine seismic system of claim 1, wherein the control system is located on the at least one host vessel, the at least one host vessel further comprising apparatus for transmitting data.

14. The marine seismic system of claim 1, wherein the control system is located on b at least one host vessel, the at least one host vessel further comprising apparatus for processing data.

15. The marine seismic system of claim 1 wherein the control system is located on another vessel spaced-apart from the at least one powered tow vehicle.

16. The marine seismic system of claim 1 wherein the control system is located on land.

17. The marine seismic system of claim 1 further comprising at least one host seismic system connected to the at least one host vessel.

18. The marine seismic system of claim 17 wherein the at least one host seismic system includes at least one seismic sensor streamer deployable from the at least one host vessel.

19. The marine seismic system of claim 17 wherein the at least one host seismic system includes at least one seismic source.

20. The marine seismic system of claim 1 wherein the control system is located on another vessel spaced-apart from the at least one powered tow vehicle.

21. The marine seismic system of claim 1 wherein the at least one seismic apparatus further comprises at least one seismic sensor streamer.

22. The marine seismic system of claim 7 wherein the at least one seismic sensor streamer further comprises a first seismic sensor streamer at a first depth and a second seismic sensor streamer at a second depth different from the first depth.

23. The marine seismic system of claim 7 wherein the data includes generated seismic data.

24. A method of acquiring seismic data comprising;
deploying in water a marine seismic system including a host vessel and at least one powered tow vehicle with at least one seismic apparatus attached thereto; and
using a control system at a spaced-apart location from and controlling the at least one powered towed vehicle for towing the at least one seismic apparatus attached thereto.

25. The method of claim 24 wherein the control system is on the host vessel, the at least one powered tow vehicle further comprises a plurality of powered tow vehicles arranged in a pattern about the at least one host vessel, and the at least one seismic apparatus further comprises at least one seismic streamer system connected to each of the plurality of tow vehicles.

26. The method of claim 25 further comprising:
selectively releasing the a least one tow vehicle from the host vehicle using a selective connection apparatus on the marine seismic system.

27. The method of claim 24 further comprising:
servicing the at least one powered tow vehicle with at least one service boat.

28. The method of claim 25 further comprising:
receiving data with the at least one seismic sensor streamer; sending the data from the at least one seismic sensor streamer to the at least e powered vehicle; sensor streamer; and
receiving the seismic data at the at least one powered vehicle and storing it there.

29. The method of claim 28 wherein the data received by the at least one seismic sensor streamer includes generated seismic data.

30. The method of claim 28 further comprising sending data from the at least one powered tow vehicle to at least one service boat.

31. The method of claim 28 further comprising sending data from the at least one powered tow vehicle to a remote location.

32. The method of claim 28 further comprising:
sending data from the at least one powered tow vehicle to the at least one host vessel.

33. The method of claim 25 further comprising:
receiving data with apparatus for receiving data on the at least one host vessel;
storing the data with apparatus for storing data on the at least one host vessel; and
transmitting the data with apparatus for transmitting data on the at least one host vessel to a remote location.

34. The method of claim 33 wherein the data is received from the at least one powered tow vehicle.

35. The method of claim 25 wherein the marine seismic system includes at least one service boat for servicing the at least one powered tow vehicle, further comprising sending data from the at least one service boat to the at least one host vessel.

36. The method of claim 33 wherein the data includes seismic data, the method further comprising:
processing the seismic data at the least one host vessel with seismic data processing apparatus on the at least one host vessel.

37. The method of claim 29 further comprising:
wirelessly acquiring data from the at least one powered tow vehicle with apparatus on the at least one service boat data for wirelessly receiving data.

38. The method of claim 24 wherein the control system is located on the at least one host vessel, the at least one seismic apparatus further comprises at least one seismic sensor streamer system, the method further comprising:
towing the at least one seismic streamer system with the at least one powered tow vehicle;
deploying at least one host seismic sensor streamer system from the host vessel; and
acquiring generated seismic data with the at least one host seismic sensor streamer system.

39. The method of claim 24 wherein the at least one seismic apparatus further comprises at least one seismic source.

40. The method of claim 24 wherein the at least one control system is on the at least one host vessel, the method further comprising;
coupling at least one seismic source to the host vessel; and
activating the at least one seismic source.

41. The method of claim 40 wherein the coupling of the seismic source to the at least one host vessel is done by a cable.

42. The method of claim 24 wherein the at least one seismic apparatus includes at least a first seismic sensor streamer and a second seismic sensor streamer, the method further comprising:
towing the first seismic sensor streamer at a first depth; and
towing the second seismic sensor streamer at a second depth different from the first depth.

43. The method of claim 24 wherein the at least one powered tow vehicle is unmanned.

* * * * *